(12) United States Patent
Osawa et al.

(10) Patent No.: US 8,422,018 B2
(45) Date of Patent: Apr. 16, 2013

(54) OPTICAL MEASUREMENT APPARATUS INCLUDING HEMISPHERICAL OPTICAL INTEGRATOR

(75) Inventors: Yoshihiro Osawa, Moriyama (JP); Kazuaki Ohkubo, Kusatsu (JP)

(73) Assignee: Otsuka Electronics Co., Ltd., Hirakata-Shi (JP)

(*) Notice: Subject to any disclaimer, the term of this patent is extended or adjusted under 35 U.S.C. 154(b) by 236 days.

(21) Appl. No.: 13/029,067

(22) Filed: Feb. 16, 2011

(65) Prior Publication Data
US 2011/0205541 A1     Aug. 25, 2011

(30) Foreign Application Priority Data
Feb. 24, 2010   (JP) ................... 2010-038377

(51) Int. Cl.
*G01N 21/55*     (2006.01)
*G01N 21/47*     (2006.01)

(52) U.S. Cl.
USPC .......................................... 356/445; 356/446

(58) Field of Classification Search .......... 356/445–448, 356/450–458
See application file for complete search history.

(56) References Cited

U.S. PATENT DOCUMENTS

| | | | | |
|---|---|---|---|---|
| 5,659,397 | A * | 8/1997 | Miller et al. | 356/446 |
| 5,803,592 | A * | 9/1998 | Lawson | 362/300 |
| 7,145,125 | B2 * | 12/2006 | May et al. | 250/228 |
| 7,663,744 | B2 * | 2/2010 | Ohkubo | 356/236 |
| 7,980,728 | B2 * | 7/2011 | Ramer et al. | 362/249.02 |
| 8,102,531 | B2 * | 1/2012 | Abbink et al. | 356/432 |
| 2005/0156103 | A1 | 7/2005 | May et al. | |

FOREIGN PATENT DOCUMENTS

| | | |
|---|---|---|
| JP | 06-167388 | 6/1994 |
| JP | 10-293063 | 11/1998 |

OTHER PUBLICATIONS

Kazuaki Ohkubo and Teruaki Shigeta "Absolute Fluorescent Quantum Efficiency of NBS Phosphor Standard Samples" Journal of Illuminating Engineering Institute of Japan, The Illuminating Engineering Institute of Japan, Feb. 1999, vol. 83, No. 2, pp. 87-93 (English abstract included).

* cited by examiner

*Primary Examiner* — Gregory J Toatley
*Assistant Examiner* — Jarreas C Underwood
(74) *Attorney, Agent, or Firm* — Ditthavong Mori & Steiner, P.C.

(57) ABSTRACT

An optical measurement apparatus includes a hemispherical portion having a diffuse reflection layer on an inner wall, and a plane portion disposed to involve a substantial center of curvature of the hemispherical portion and close an opening of the hemispherical portion, and having a reflection layer on an inner surface side of the hemispherical portion. The plane portion includes: at least one of a window for introducing light to be homogenized in an integrating space formed between the hemispherical portion and the plane portion, and a window for extracting light homogenized in the integrating space; an outer portion formed of a first material chiefly causing specular reflection, and occupying at least a region of a predetermined width from an outermost circumference; and an inner portion formed of a second material chiefly causing diffuse reflection and having a higher reflectance for at least an ultraviolet region than the first material.

10 Claims, 13 Drawing Sheets

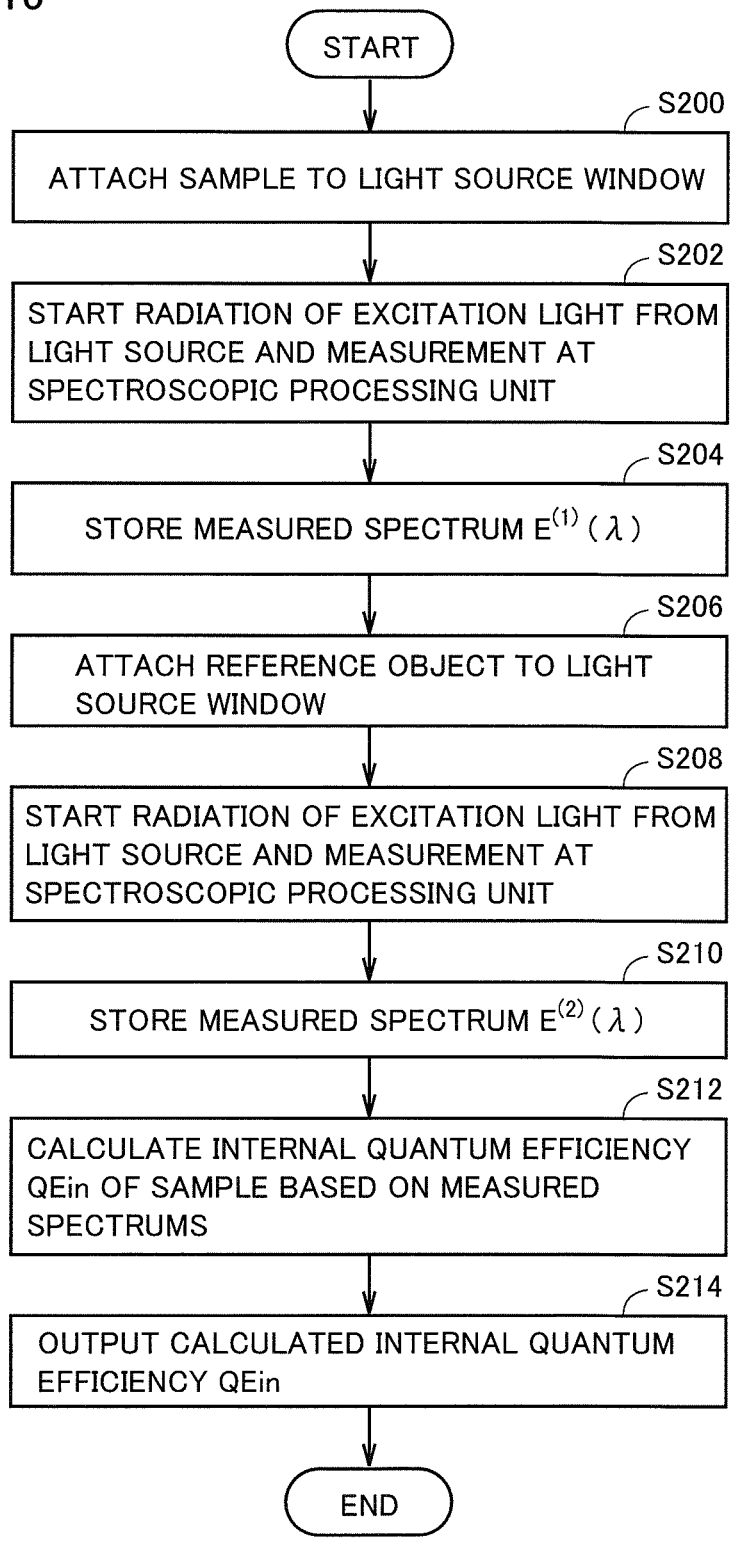

OPTICAL MEASUREMENT APPARATUS INCLUDING HEMISPHERICAL OPTICAL INTEGRATOR

BACKGROUND OF THE INVENTION

1. Field of the Invention

The present invention relates to an optical measurement apparatus including a hemispherical optical integrator for homogenizing light, and particularly to a configuration that enables improvement in integrating efficiency.

2. Description of the Background Art

Recently, development of new light sources such as LED (Light Emitting Diode) and EL (Electro Luminescence) has been advancing rapidly. As an indicator for evaluating such light sources, an indicator such as total luminous flux or color of light of a light source is used. In particular, the total luminous flux of a light source is an important indicator for determining not only the output (lm: lumen) but also the lamp efficiency (lm/W) of the light source.

In order to measure the total luminous flux of such a light source, an integrating sphere (spherical photometer) has been used in which a diffusing material such as barium sulfate is applied to the inner wall of the hollow sphere. In the case where this integrating sphere is used, a light source is lit at the center of the integrating sphere to homogenize the light radiated from the light source and calculate the total luminous flux based on the illuminance of the homogenized light.

Regarding a conventional method of measuring the total luminous flux by means of such an integrating sphere, absorption of light by a jig which is used for securing a light source to be measured to the center of the integrating sphere, and self absorption of the light source itself are error factors. Thus, a method for correcting such errors has been proposed. With such a correction only, however, it has been difficult to precisely measure a light source with which a lighting circuit and a heat-radiation/cooling device are integrated such as high power LED or a surface light source with which an optical system is integrated such as EL or backlight.

As a means for solving such a problem, a hemispherical optical integrator as disclosed in Japanese Patent Laying-Open No. 06-167388 has been proposed.

Further, as an indicator for evaluating a phosphor used for a fluorescent lamp, display or the like, the quantum efficiency is also employed. As a typical means for measuring the quantum efficiency, an optical system for measuring the quantum efficiency of a phosphor is disclosed in "Ohkubo and Shigeta, 'Absolute Fluorescent Quantum Efficiency of NBS Phosphor Standard Samples,' Journal of the Illuminating Engineering Institute of Japan, The Illuminating Engineering Institute of Japan, 1999, Vol. 83, No. 2, pp. 87-93" and Japanese Patent Laying-Open No. 10-293063. For such measurement of the quantum efficiency as well, a hemispherical optical integrator as described above can be used.

More specifically, a hemispherical optical integrator as disclosed in Japanese Patent Laying-Open No. 06-167388 includes a hemispherical portion having, on its inner wall, a diffuse reflection layer of a diffusing material such as barium sulfate, and a plane mirror that causes specular reflection (mirror reflection) of light. When the total luminous flux of a light source is to be measured, the light source, which is an object to be measured, is mounted on the plane mirror and at the position of the center of curvature of the hemispherical portion. At this time, a virtual spherical integrating space is created by the hemispherical portion and a virtual image of the hemispherical portion generated by the plane mirror.

A circuit for lighting the light source to be measured and a jig or the like for securing the light source to be measured are located on the opposite side to the hemispherical portion with respect to the plane mirror, and therefore, they can be excluded from this virtual integrating space. Thus, errors due to absorption of light by these circuit and jig or the like can be avoided in principle. In the case where a surface light source is an object to be measured, the light source may be mounted such that only a light emitting portion of the light source is exposed from a window of the plane mirror to thereby avoid the influence of light absorption by a non-light-emitting portion of the object to be measured.

It is noted that U.S. Patent Application Publication US2005/0156103A1 discloses an integrating chamber capable of combining energies of different wavelengths from a plurality of light sources. This integrating chamber merely mixes light rays from the light sources, and does not perform homogenization of the light, which is necessary for measuring the total luminous flux.

As has been described, the hemispherical optical integrator homogenizes light to be measured, by successively reflecting the light from the diffuse reflection layer formed on the inner wall of the hemispherical portion and from the plane mirror. Therefore, it is required to use, for respective reflection surfaces of the inner wall of the hemispherical portion and the plane mirror, a material having a relatively high reflectance for the whole wavelength range of the light to be measured.

However, any material which is to be used for the plane mirror and has a relatively high reflectance particularly in the ultraviolet region or the like of shorter wavelengths is relatively expensive. A problem is therefore that a higher integrating efficiency to be achieved is accompanied by a higher cost of the plane mirror, while a reduced cost to be achieved is accompanied by a lower integrating efficiency.

SUMMARY OF THE INVENTION

The present invention has been made to solve such problems as described above, and an object of the invention is to provide an optical measurement apparatus achieving a higher integrating efficiency and a reduced cost.

An optical measurement apparatus according to an aspect of the present invention includes a hemispherical portion having a diffuse reflection layer on an inner wall, and a plane portion, disposed to involve a substantial center of curvature of the hemispherical portion and close an opening of the hemispherical portion, having a reflection layer that faces an inner surface side of the hemispherical portion. The plane portion includes at least one of a window for introducing light to be homogenized in an integrating space formed between the hemispherical portion and the plane portion, and a window for extracting light homogenized in the integrating space. The plane portion further includes an outer portion formed of a first material chiefly causing specular reflection, and occupying at least a region of a predetermined width from an outermost circumference at which the plane portion abuts on the inner wall of the hemispherical portion, and an inner portion formed of a second material chiefly causing diffuse reflection and having a higher reflectance for at least an ultraviolet region than the first material, and occupying a region inside the outer portion.

Preferably, a range of the inner portion is defined so that an influence of light absorption between the inner portion and the inner wall of the hemispherical portion is substantially negligible.

Preferably, a range of the inner portion is defined so that light absorptance in the integrating space is a predetermined value or less.

More preferably, the predetermined value is 10%.

Preferably, the inner portion is disposed in a circle having a radius of a length of 50% to 70% relative to a distance from the substantial center of curvature of the hemispherical portion to the outermost circumference.

More preferably, the inner portion is a polygon and the circle is a circumcircle of the polygon.

Preferably, the inner portion is defined to have an area of 25% to 50% relative to an area of a region within the outermost circumference.

Preferably, the outer portion is formed of a metal-deposited mirror, and the inner portion is formed of one of sintered polytetrafluoroethylene and barium sulfate.

Preferably, the plane portion includes a first window to which a light source to be measured can be attached so that a luminous flux generated from the light source is applied toward the inner wall of the hemispherical portion. The optical measurement apparatus further includes: a detector for detecting illuminance at the inner wall of the hemispherical portion through a second window disposed at the hemispherical portion or the plane portion, and a blocking portion disposed on a path from the first window to the second window.

Preferably, the plane portion includes a first window provided near the substantial center of curvature of the hemispherical portion, and a second window provided at a position separated by a predetermined distance from the first window. The optical measurement apparatus further includes: a light source for emitting excitation light through the first window; a spectroscope for measuring a spectrum at the inner wall of the hemispherical portion through the second window; and a processing unit for calculating a quantum efficiency of an object to be measured that is disposed to have at least a portion exposed to inside of the hemispherical portion, based on a first spectrum measured by the spectroscope when the excitation light is applied from the light source to the object to be measured, and a second spectrum measured by the spectroscope when the excitation light is applied from the light source to a reference object disposed instead of the object to be measured and having a known reflectance characteristic or transmittance characteristic.

With the optical measurement apparatus of the present invention, a higher integrating efficiency as well as a reduced cost are achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a flowchart showing a procedure for measuring the quantum efficiency of a sample by means of the optical measurement apparatus for Application 2 in the embodiment of the present invention.

DESCRIPTION OF THE PREFERRED EMBODIMENTS

Figure 1:
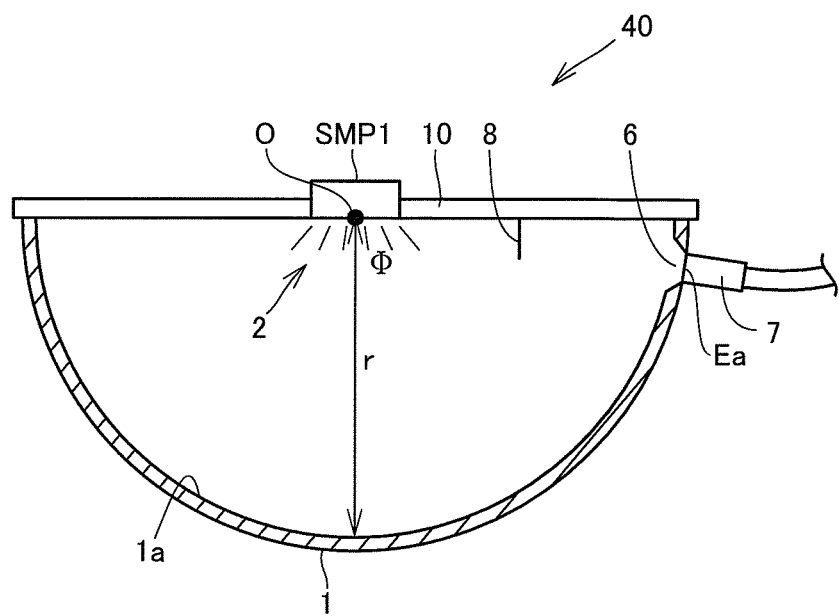
FIG. 1 shows an example of a cross section of a hemispherical optical integrator according to an embodiment of the present invention.

An embodiment of the present invention will be described in detail with reference to the drawings. In the drawings, the same or corresponding components are denoted by the same reference characters, and a description thereof will not be repeated.

<A. Overview>

An optical measurement apparatus according to the present embodiment includes a hemispherical optical integrator. This hemispherical optical integrator is constituted of a hemispherical portion having a diffuse reflection layer on the inner wall, and a plane portion disposed to close an opening of the hemispherical portion. The plane portion involves a substantial center of curvature of the hemispherical portion, and has a reflection layer that faces at least the inner surface side of the hemispherical portion.

Between the hemispherical portion and the plane portion, an integrating space is formed. Specifically, an image (real image) produced between the hemispherical portion and the plane portion is reflected by the plane portion to create a virtual image. The real image and the virtual image may be combined to provide the integrating space which is substantially identical to that of the conventional unsophisticated integrating sphere.

The plane portion includes, as described later herein, at least one of a window for introducing light to be homogenized in the integrating space which is formed between the hemispherical portion and the plane portion, and a window for extracting the light homogenized in the integrating space, depending on an application. Further, depending on an application, a part of the hemispherical portion may be provided with a window.

In particular, in the hemispherical optical integrator according to the present embodiment, a mirror that causes mirror reflection (specular reflection) is not used for the entire plane portion. Instead, for an outer circumferential side of the plane portion (hereinafter also referred to as "outer portion"), a material that causes specular reflection is used and, for an inner circumferential side thereof (hereinafter also referred to as "inner portion"), a material having a higher reflectance in at least the ultraviolet region than the material for the outer portion is used.

As described later herein, the material used for the inner portion is less expensive and has a higher reflectance for the ultraviolet region than the material used for the outer portion. On such a material for the inner portion, however, diffuse reflection occurs. In order to accomplish functions more appropriate for the optical integrator, it is therefore necessary to appropriately design the range (position, region, size, and the like) of the outer portion and the inner portion each.

Thus, materials appropriate respectively for the outer portion and the inner portion can be used and the outer portion and the inner portion can be arranged each in an appropriate range to thereby provide a hemispherical optical integrator with a reduced cost and a high integrating efficiency (less light absorption).

<B. Overview of Hemispherical Optical Integrator>

Referring first to FIG. 1, a hemispherical optical integrator according to the present embodiment will be described.

Hemispherical optical integrator 40 according to the present embodiment includes a hemispherical portion 1 and a disk-shaped plane portion 10 disposed to close the opening of this hemispherical portion 1. Hemispherical portion 1 has a diffuse reflection layer 1a on its inner surface (inner wall). This diffuse reflection layer 1a is formed exemplarily by applying or spraying a diffusing material such as sintered polytetrafluoroethylene (PTFE) or barium sulfate.

Plane portion 10 is disposed to involve the substantial center of curvature of hemispherical portion 1. It is noted that the center of curvature of hemispherical portion 1 refers exemplarily to the center O of curvature of the inner surface of hemispherical portion 1. Further, on plane portion 10, a reflection surface is formed that faces at least the inner surface side of hemispherical portion 1.

FIG. 1 shows an example of the configuration where hemispherical optical integrator 40 is used to measure the total luminous flux from a light source SMP 1 which is an object to be measured. In this example of the configuration, plane portion 10 has a light source window 2 formed to allow the inner surface side and the outside of hemispherical portion 1 to communicate with each other. Light source window 2 serves as a window for introducing light to be homogenized in the integrating space formed between hemispherical portion 1 and plane portion 10. Namely, to light source window 2, light source SMP 1 to be measured can be attached in such a manner that the luminous flux generated by light source SMP 1 to be measured is radiated toward the inner wall of hemispherical portion 1.

Further, hemispherical portion 1 has an observation window 6 for measuring the illuminance at the inner wall of hemispherical portion 1. To this observation window 6, a light receiving portion 7 is connected, and a detector (not shown) is used to detect the illuminance at the inner wall of hemispherical portion 1. Furthermore, in hemispherical optical integrator 40, a shielding portion (baffle) 8 positioned between a light emission surface of light source SMT 1 and observation window 6 is provided. This baffle 8 reduces an error resulting from direct incidence, on the detector, of the luminous flux from light source SMP 1 through observation window 6.

Regarding the configuration shown in FIG. 1, where the total luminous flux radiated from light source SMP 1 is denoted by (1), the illuminance obtained through homogenization of the light in the integrating space formed between hemispherical portion 1 and plane portion 10 may be expressed as follows. Namely, light-receiving-surface illuminance Ea measured at light receiving portion 7 is represented as expression (1):

$$E_a = \Phi/(4\pi \cdot r^2)\{\rho/(1-\rho) + \rho_M \rho/(1-\rho_M \rho)\} \quad (1)$$

where r: the radius of hemispherical portion 1,

ρ: the average reflectance of diffuse reflection layer 1a of hemispherical portion 1, and $\rho_M$: the average reflectance of plane portion 10.

As clearly seen from expression (1) above, a larger value of average reflectance ρ of diffuse reflection layer 1a of hemispherical portion 1 and a larger value of average reflectance $\rho_M$ of plane portion 10 can provide a larger absolute value of light-receiving-surface illuminance Ea. It is therefore preferable that diffuse reflection layer 1a of hemispherical portion 1 and the reflection layer of plane portion 10 each have a reflectance of approximately 0.95 or more.

Figure 2:
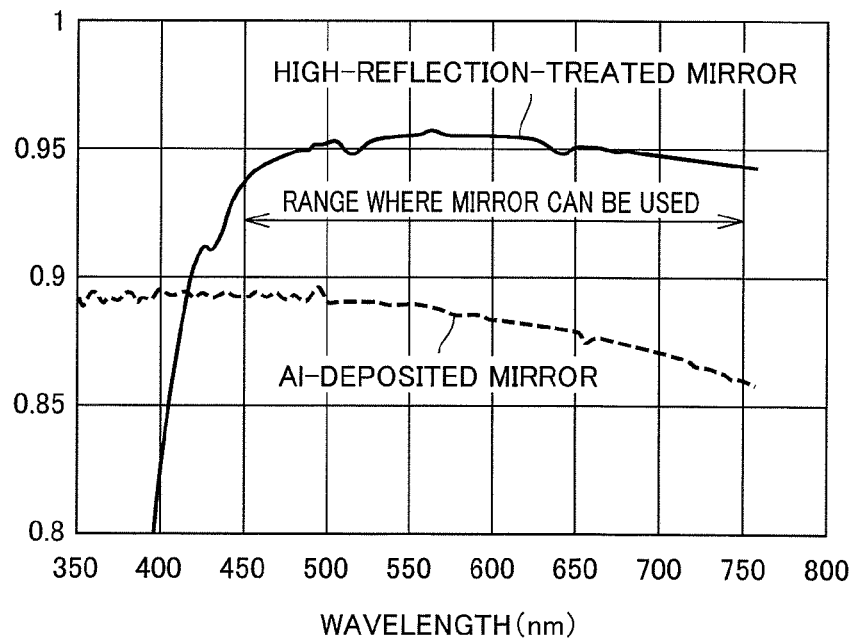
FIG. 2 shows wavelength characteristics of the reflectance of materials each used as a plane portion.

FIG. 2 shows the reflectance of an aluminum-deposited mirror (Al-deposited mirror) and the reflectance of a high-reflection-treated mirror produced by applying a coating to an aluminum-deposited mirror in comparison with each other, which may be each used as the reflection layer of plane portion 10.

The aluminum-deposited mirror keeps a reflectance of 0.85 to 0.9 for a wavelength range of 350 nm to 650 nm including the ultraviolet region and the visible region. In contrast, while the high-reflection-treated mirror keeps a reflectance around 0.95 or more for the visible region, the reflectance of the high-reflection-treated mirror is extremely lower for the ultraviolet region. Namely, the high-reflection-treated mirror can be used for a range of approximately 450 nm to 750 nm.

It is noted that sintered polytetrafluoroethylene (PTFE), barium sulfate and the like used for diffuse reflection layer 1a of hemispherical portion 1 achieve a reflectance of approximately 0.95 for almost the whole range from the ultraviolet region to the visible region.

In view of the wavelength characteristic of the reflectance as shown in FIG. 2, in the case where chiefly a luminous flux in the visible region is to be radiated from light source SMP 1 to be measured, a high-reflection-treated mirror may be employed as plane portion 10 to enhance the integrating efficiency.

In the case, however, where a luminous flux to be radiated from light source SMP 1 to be measured includes a component in the ultraviolet region, the high-reflection-treated mirror cannot be used. Then, it is the only option to use the aluminum-deposited mirror. Consequently, the reflectance of plane portion 10 is lower than that obtained when the high-reflection-treated mirror is used, resulting in a problem that the integrating efficiency, namely the absolute value of light-receiving-surface illuminance Ea measured at light receiving portion 7 is smaller.

In view of the above, hemispherical optical integrator 40 according to the present embodiment has plane portion 10 constituted of a portion (outer portion) made of a material that causes specular reflection and a portion (inner portion) made of a material having a higher reflectance for at least the ultraviolet region relative to the outer portion.

Figure 3:
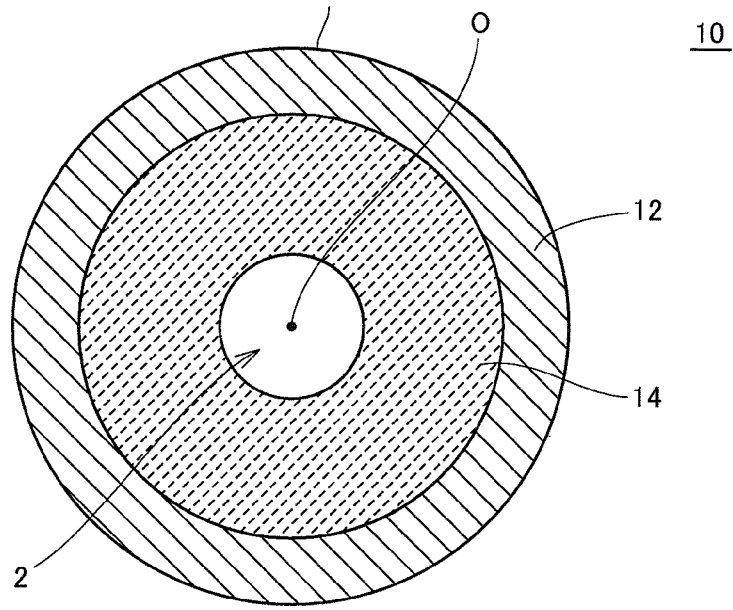
FIG. 3 schematically shows the plane portion for constituting the hemispherical optical integrator according to the embodiment of the present invention.

Referring to FIG. 3, plane portion 10 includes an outer portion 12 occupying at least a region of a predetermined width from the outermost circumference at which plane portion 10 abuts on the inner wall (diffuse reflection layer 1a) of hemispherical portion 1, and an inner portion 14 occupying the region inside the outer portion 12. Outer portion 12 is formed of a metal-deposited mirror (typically aluminum-deposited mirror), and mainly causes specular reflection of incident light. Inner portion 14 has a higher reflectance for at least the ultraviolet region than outer portion 12, and mainly causes diffuse reflection of incident light. Typically, inner portion 14 is made, similarly to diffuse reflection layer 1a of hemispherical portion 1, of sintered polytetrafluoroethylene (PTFE), barium sulfate or the like. For such sintered polytetrafluoroethylene (PTFE), Spectralon® of Labsphere, Inc. in the US is suitable.

<C. Plane Portion>

For outer portion 12 and inner portion 14 each, which constitute plane portion 10 as shown in FIG. 3, the range (position, region, size, and the like) thereof has to be designed appropriately. In the following, how to design outer portion 12 and inner portion 14 will be described.

For designing outer portion 12 and inner portion 14, the following two factors have to be taken into account.

(1) The integrating efficiency of the optical integrator as a whole has a predetermined design value or more.

(2) Diffuse reflection occurring on inner portion 14 does not influence the essential performance of the optical integrator.

Specifically, in terms of factor (1), it is preferable that the range occupied by inner portion 14 is larger. In contrast, in terms of factor (2), it is preferable that the range occupied by inner portion 14 is smaller. Accordingly, plane portion 10 is designed so that factors (1) and (2) are satisfied.

c1. Light Absorption at Outermost Circumference Portion

Regarding the above-described factor (1), light absorption near the joint portion where hemispherical portion 1 and plane portion 10 are connected (outermost circumference portion) will be considered below.

Figure 4A:
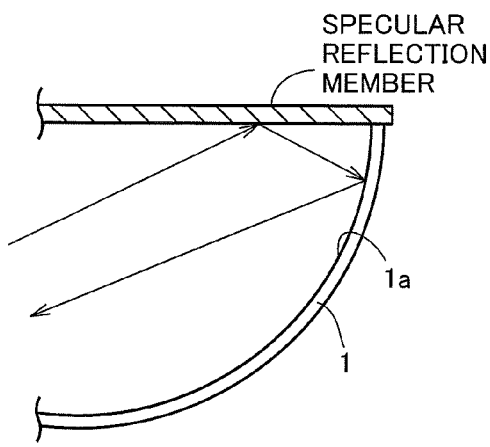
FIGS. 4A and 4B each schematically show an example of the behavior of light near a joint portion where a hemispherical portion and the plane portion are connected to each other.
Figure 4B:
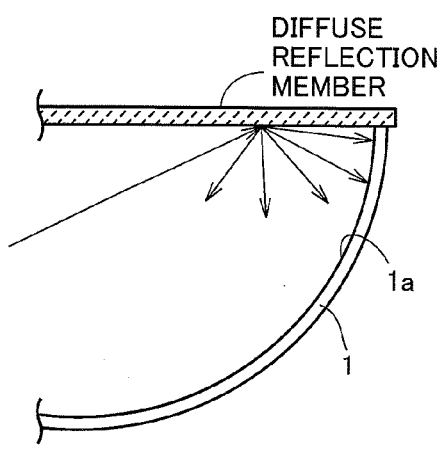

FIG. 4A shows a case where plane portion 10 is formed of a specular reflection member, and FIG. 4B shows a case where plane portion 10 is formed of a diffuse reflection member.

As shown in FIG. 4A, in the case where plane portion 10 is formed of a specular reflection member, any light incident on plane portion 10 at an angle of incidence is reflected at the same angle. Even if diffuse reflection of the light occurs on diffuse reflection layer 1a of hemispherical portion 1, the light incident on plane portion 10 is eventually reflected in the direction opposite to the direction of incidence on plane portion 10 and therefore, the light is not confined near the joint portion between hemispherical portion 1 and plane portion 10.

In contrast, as shown in FIG. 4B, in the case where plane portion 10 is formed of a diffuse reflection member, any light incident on plane portion 10 is reflected in multiple directions about the direction at an angle corresponding to the angle of incidence. Further, at diffuse reflection layer 1a of hemispherical portion 1 as well, diffuse reflection of the light occurs. Therefore, a part of the light may undergo multiple reflections between hemispherical portion 1 and plane portion 10. As seen from the above, in the case where plane portion 10 is formed of a diffuse reflection member, the light is confined in the vicinity of the joint portion between hemispherical portion 1 and plane portion 10, resulting in light absorption occurring in the vicinity thereof.

Outer portion 12 is therefore designed in such a manner that outer portion 12 occupies at least a region of a predetermined width from the outermost circumference at which plane portion 10 abuts on the inner wall of hemispherical portion 1. In other words, the range of inner portion 14 is defined so that the influence of light absorption between inner portion 14 and the inner wall of hemispherical portion 1 is substantially negligible.

c2. Integrating Efficiency/Absorptance

Regarding the above-described factor (1), what is to be taken into account is that the ratio between outer portion 12 and inner portion 14 is defined so that the absorptance of the light in the integrating space formed between hemispherical portion 1 and plane portion 10 is a predetermined value or less. Since the reflectance of the aluminum-deposited mirror as shown in FIG. 2 is around 0.9 (90%), the design is preferably made at least so that the absorptance of the light in the integrating space is not more than 10%.

In other words, it is preferable that, of the total luminous flux emitted from a light source to be measured, at least 90% is detected in the form of the illuminance at the inner wall of hemispherical portion 1.

c3. Influence of Non-Specular Reflection Region of Plane Portion on Integrating Capability Regarding the above-described factors (1) and (2), the influence of a non-specular reflection region formed at plane portion 10 on the integrating capability will now be considered.

In the case of the hemispherical optical integrator, a higher ratio of occupation by a non-specular reflection region (inner portion 14 or light source SMP 1) of plane portion 10 is accompanied by a higher ratio of a luminous flux that does not create a virtual image, and accordingly the hemispherical optical integrator fails to perform the essential function of the optical integrator. In other words, when the non-specular reflection region is formed of a member causing diffuse reflection like inner portion 14 or the like, a proper virtual image is not created. When the non-specular reflection region is formed of a member absorbing light like light source SMP 1, not only the absence of a virtual image but also degradation of the integrating efficiency occurs.

Figure 5:
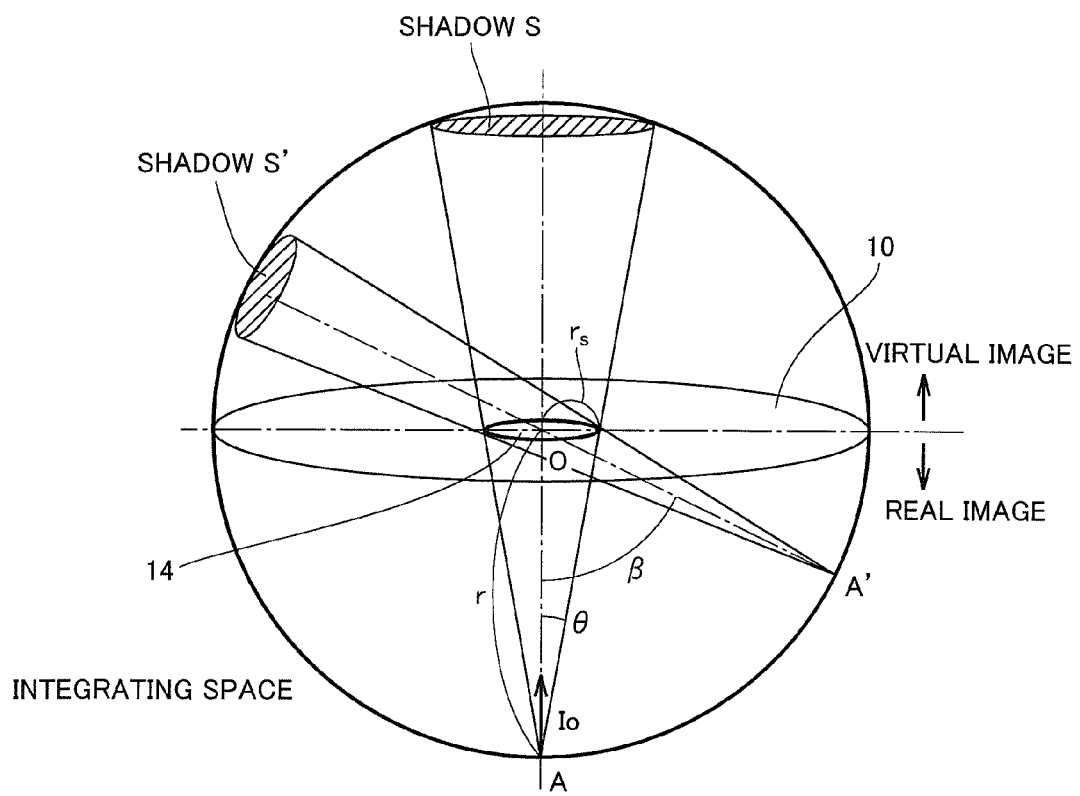
FIG. 5 shows a model for evaluating an influence, on the integrating capability, of a non-specular reflection region of the plane portion in the hemispherical optical integrator according to the embodiment of the present invention.

Here, referring to FIG. 5, shadows created as a part of a virtual image due to a non-specular reflection region will be considered.

FIG. 5 shows shadows S and S' each generated due to blockage, by a non-specular reflection region of plane portion 10, of the light reflected at a position on diffuse reflection layer 1a of hemispherical portion 1. It is assumed here that plane portion 10 is a circle having a radius r from the center of curvature O of hemispherical portion 1, and that the non-specular reflection region of plane portion 10 is a circle having a radius $r_s$ from the center of curvature O of hemispherical portion 1. As shown in FIG. 5, the largest one of shadows created due to the presence of the non-specular reflection region of plane portion 10 is shadow S of the light reflected at a point A on the wall surface of hemispherical portion 1 that is located in the direction perpendicular to the non-specular reflection region of plane portion 10.

Further, with respect to shadow S, shadow S' of the light reflected at a point A' on the wall surface of hemispherical portion 1 that is located at an angle β to the direction perpendicular to the non-specular reflection region of plane portion 10 is expressed as S'=S·cos β.

Where a point on the perimeter of the non-specular reflection region is located at an angle θ to the perpendicular, a solid angle $\omega_s$ for a spherical-cap-shaped shadow of the non-specular reflection region, from the center of curvature O of the inner surface of hemispherical portion 1, may be represented as expression (2).

$$\omega_s = 2\pi \cdot (1 - \cos 2\theta) \quad (2)$$

Since the total solid angle from the center of curvature O of hemispherical portion 1 in the integrating space formed of a real image and a virtual image is $4\pi$, the ratio R of shadow S (a spherical cap corresponding to the shadow created by the light reflected at A) of the non-specular reflection region, to the inner surface area of the integrating space, is $\omega_s/4\pi$. Therefore, ratio R ($\beta$) of shadow S' created by the light reflected at point A' on the wall surface of hemispherical portion 1 that is located at angle $\beta$ to the perpendicular of the non-specular reflection region of plane portion 10, may be represented as expression (3).

$$R(\beta) = (\omega_s/4\pi) \cdot \cos \beta \quad (3)$$

If diffuse reflection layer 1a of hemispherical portion 1 causes ideal diffuse reflection, distribution of the light reflected from diffuse reflection layer 1a is ideal diffusion. Therefore, if the same reflected light is generated at both point A and point A' on the wall surface of hemispherical portion 1, the ratio of the area of the generated shadow relative to the inner surface area of the integrating space is determined by integrating expression (3) over angle $\beta$.

Figure 6:
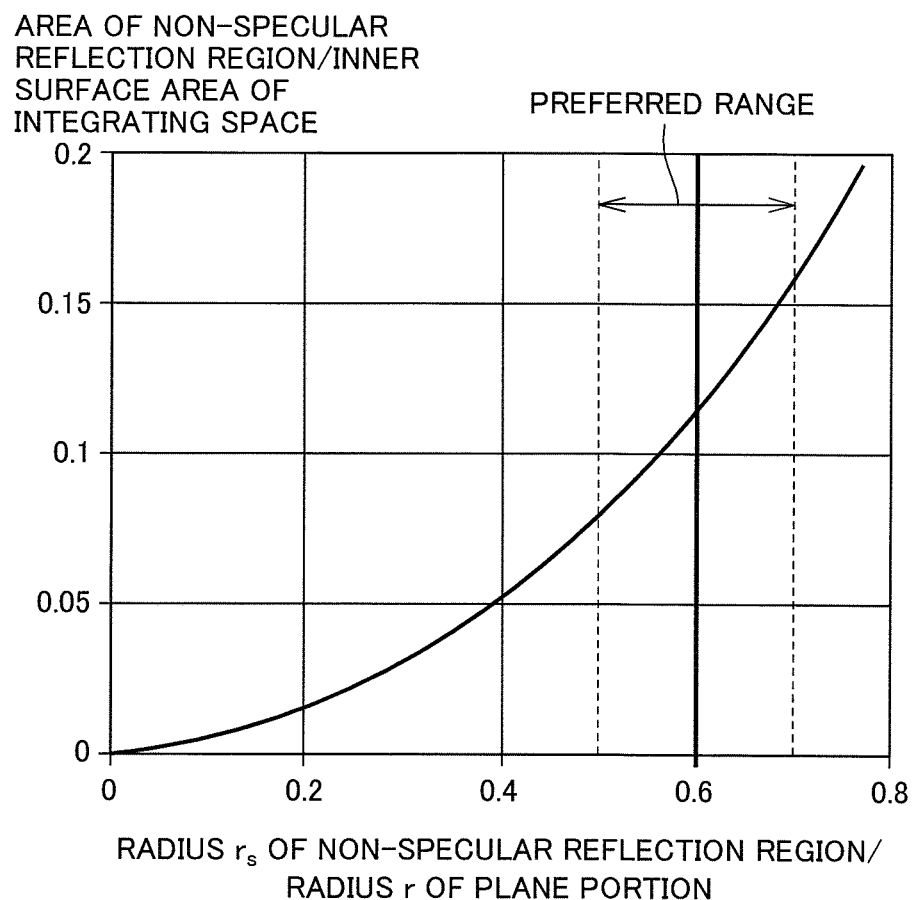
FIG. 6 shows the ratio of a luminous flux blocked by a non-specular reflection region, with respect to the ratio of the radius of the non-specular reflection region to the radius of the plane portion, calculated for the model shown in FIG. 5.
Figure 7:
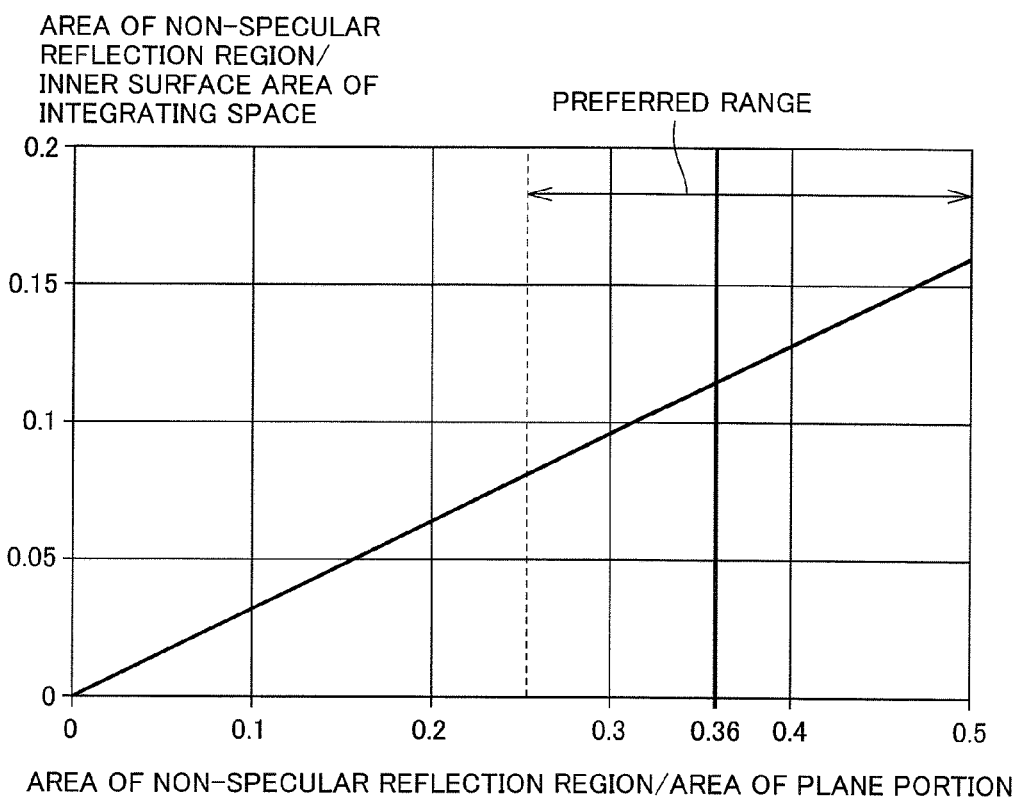
FIG. 7 shows the ratio of a luminous flux blocked by a non-specular reflection region, with respect to the ratio of the area of the non-specular reflection region to the area of the plane portion, calculated for the model shown in FIG. 5.

FIG. 6 shows the ratio of a luminous flux blocked by the non-specular reflection region, with respect to the ratio of radius $r_s$ of the non-specular reflection region to radius r of the plane portion, which is calculated for the model shown in FIG. 5. FIG. 7 shows the ratio of a luminous flux blocked by the non-specular reflection region, with respect to the ratio of the area of the non-specular reflection region to the area of the plane portion, which is calculated for the model shown in FIG. 5. It is noted that the ratio of the luminous flux blocked by the non-specular reflection region corresponds to the ratio of the area of the non-specular reflection region to the inner surface area of the integrating space.

It is supposed for example that the ratio of radius $r_s$ of the non-specular reflection region of plane portion 10, to radius r of plane portion 10, is 60% (the ratio of the area of the non-specular reflection region of plane portion 10 to the area of plane portion 10 is 36%). In this case, if the non-specular reflection region has a reflectance of approximately 0.95, the extent to which the illuminance at the wall surface of hemispherical portion 1 decreases due to the presence of the shadow of the non-specular reflection region can be kept at 1% or less, relative to the case where the non-specular reflection region is not provided.

Plane portion 10 can be formed so that such a design value is achieved to enhance the integrating efficiency of the optical integrator as a whole, without being accompanied by degradation of the essential performance of the optical integrator.

In the above case and where light source SMP 1 which is an object to be measured is attached to the non-specular reflection region and this light source SMP 1 has a reflectance of zero (absorbs all incident light), the illuminance at the wall surface of hemispherical portion 1 is lower by approximately 12%, due to the presence of the shadow of the non-specular reflection region, than the illuminance in the case where the non-specular reflection region is not provided. Namely, as shown in FIGS. 6 and 7, the ratio of the luminous flux blocked by the non-specular reflection region is 0.12.

Therefore, as shown in FIG. 6, it is preferable to make a design so that radius $r_s$ of the non-specular reflection region of plane portion 10 is in a range of approximately 60%±10%, namely in a range of approximately 50% to 70%, relative to radius r of plane portion 10. In other words, it is preferable that inner portion 14 is placed inside a circle having a radius (radius $r_s$) with a length of approximately 50% to 70% relative to the distance from the substantial center of curvature O of hemispherical portion 1 to the outermost circumference (radius r).

Alternatively, as shown in FIG. 7, it is preferable to make a design so that the ratio of the area of the non-specular reflection region relative to the area of plane portion 10 is in a range of approximately 36%±15%, namely in a range of approximately 25% to 50%. In other words, it is preferable that inner portion 14 is defined to have an area of approximately 25% to 50% relative to the area of the region inside the outermost circumference.

In a typical example of the design, where the distance from the substantial center of curvature O of hemispherical portion 1 to the outermost circumference is approximately 70 mm (2.75 inches), the radius of inner portion 14 may be approximately 42 mm (1.65 inches).

<D. Variations>

In addition to above-described plane portion 10 as shown in FIG. 3, any shape of outer portion 12 and inner portion 14 each may be used, on the condition that the two factors considered in the above section C are satisfied.

Figure 8:
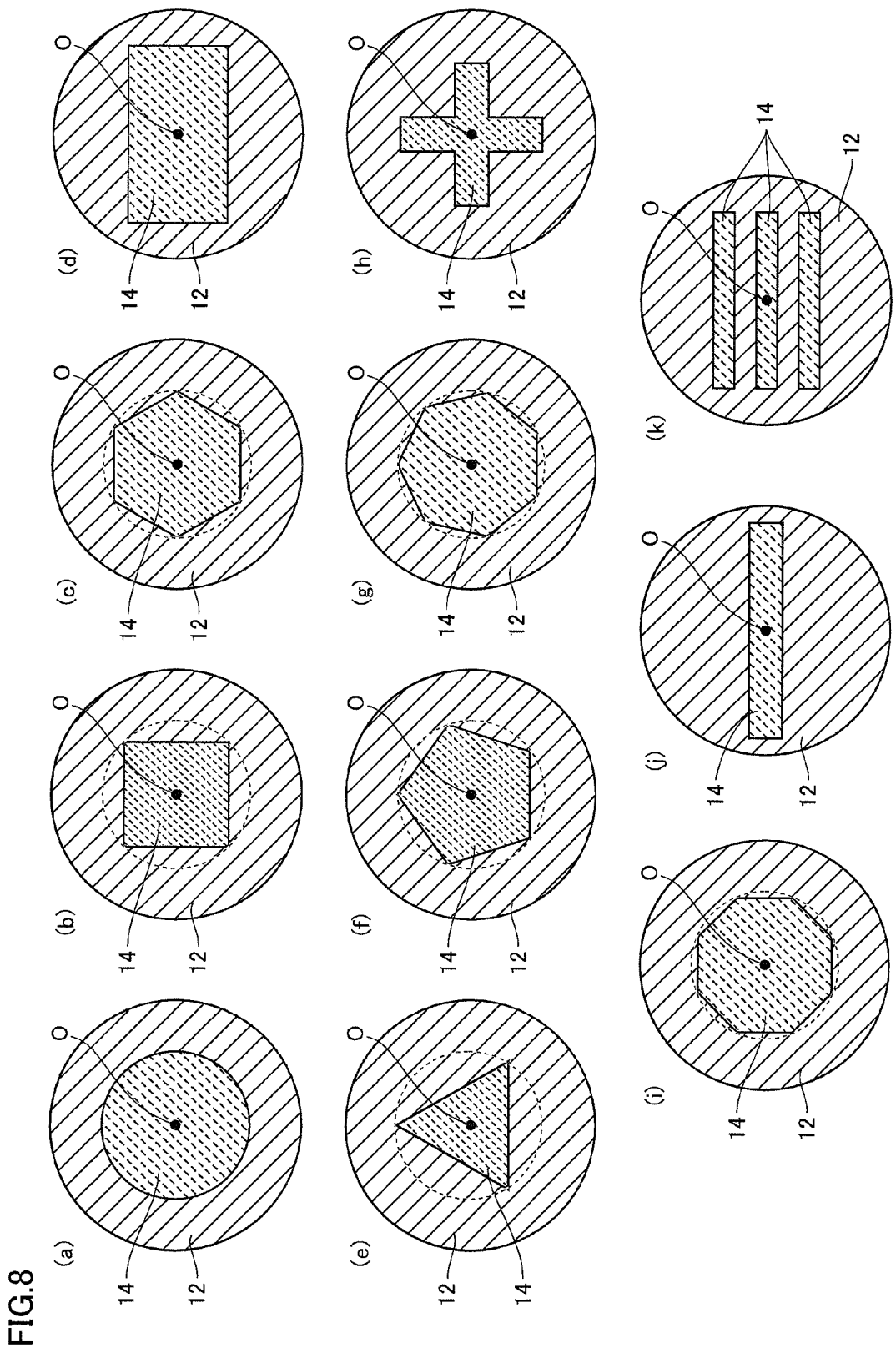
FIGS. 8 and 9 schematically show variations of the plane portion for constituting the hemispherical optical integrator according to the embodiment of the present invention.
Figure 9:
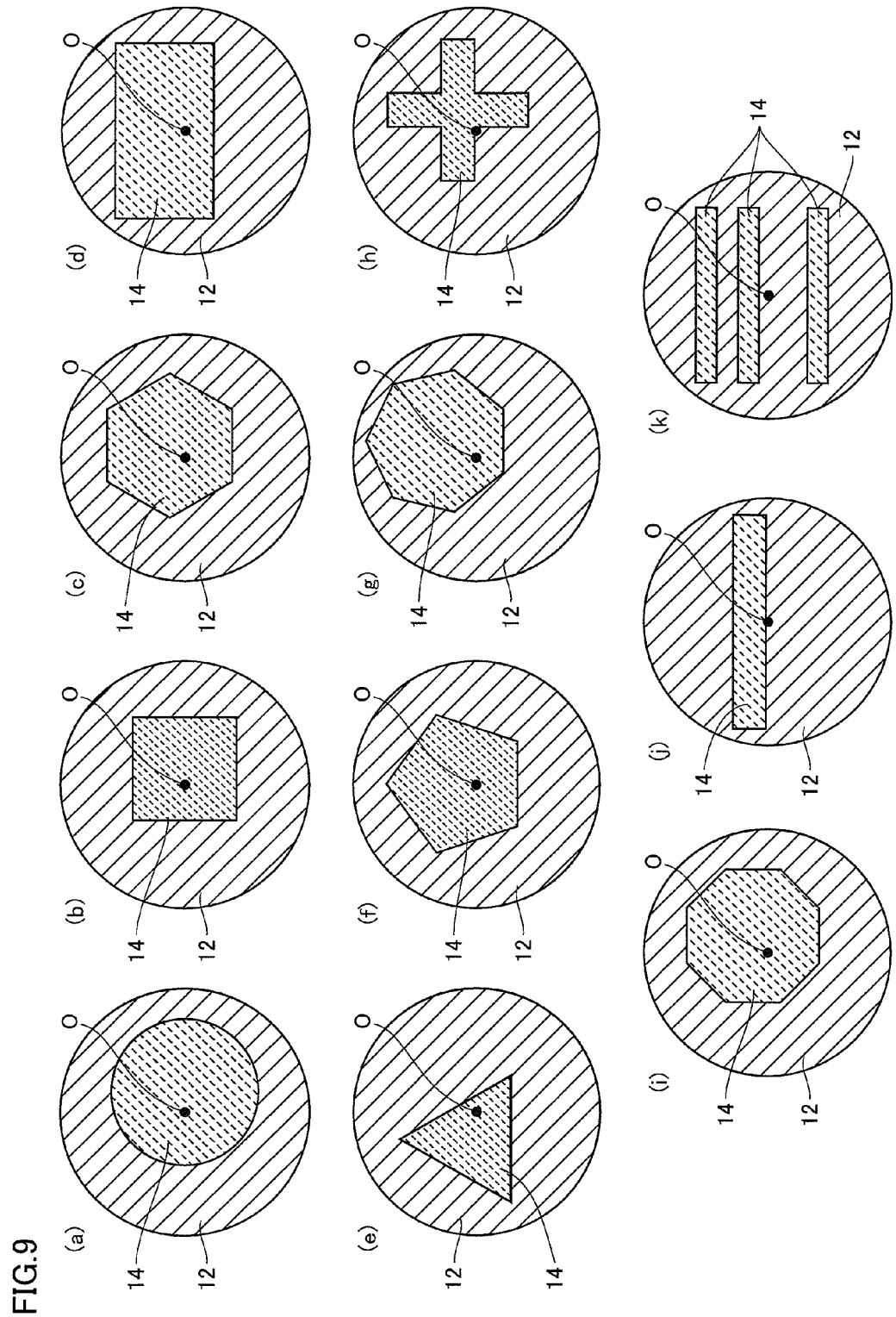

FIGS. 8 and 9 schematically show variations of plane portion 10 for constituting hemispherical optical integrator 40 according to the embodiment of the present invention. FIG. 8 shows examples where the barycenter of inner portion 14 coincides with center O of plane portion 10, and FIG. 9 shows examples where the barycenter of inner portion 14 does not coincide with center O of plane portion 10.

By way of example, square inner portion 14 shown in FIG. 8 (b), regular hexagonal inner portion 14 shown in FIG. 8 (c), regular triangular inner portion 14 shown in FIG. 8 (e), regular pentagonal inner portion 14 shown in FIG. 8 (f), regular heptagonal inner portion 14 shown in FIG. 8 (g), and regular octagonal inner portion 14 shown in FIG. 8 (i) are preferably designed to be sized so that circular inner portion 14 as shown in FIG. 8 (a) is a circumcircle of the polygons each. In other words, these polygonal inner portions 14 may each be configured to be inscribed in a circle having radius $r_s$ which is 50% to 70% of radius r of plane portion 10.

Further, as shown in FIG. 9, the plane portion may be formed so that the barycenter of inner portion 14 does not coincide with center O of plane portion 10.

It is noted that the shape of inner portion 14 is designed in some cases to fit the size and shape of an object to be measured. Namely, hemispherical optical integrator 40 according to the present embodiment is applicable to a variety of optical measurement methods and, depending on the measurement method in the application, it is required to dispose a light source or the like which is an object to be measured, so that the light source is exposed to the inside of the hemisphere. In this case, the apparatus may be used in such a form where outer portion 12 and inner portion 14 can be separated from each other and the whole or a part of inner portion 14 is removed for attaching the light source to be measured.

<E. Application 1>

Next, a description will be given of a configuration where hemispherical optical integrator 40 according to the present embodiment is used to measure the total luminous flux radiated from a light source to be measured. When the total luminous flux is to be measured, basically an optical measurement apparatus similar to that in FIG. 1 is configured. Here, the following description will illustrate a configuration having a mechanism for compensating for absorption of light by a light source or the like.

Figure 10:
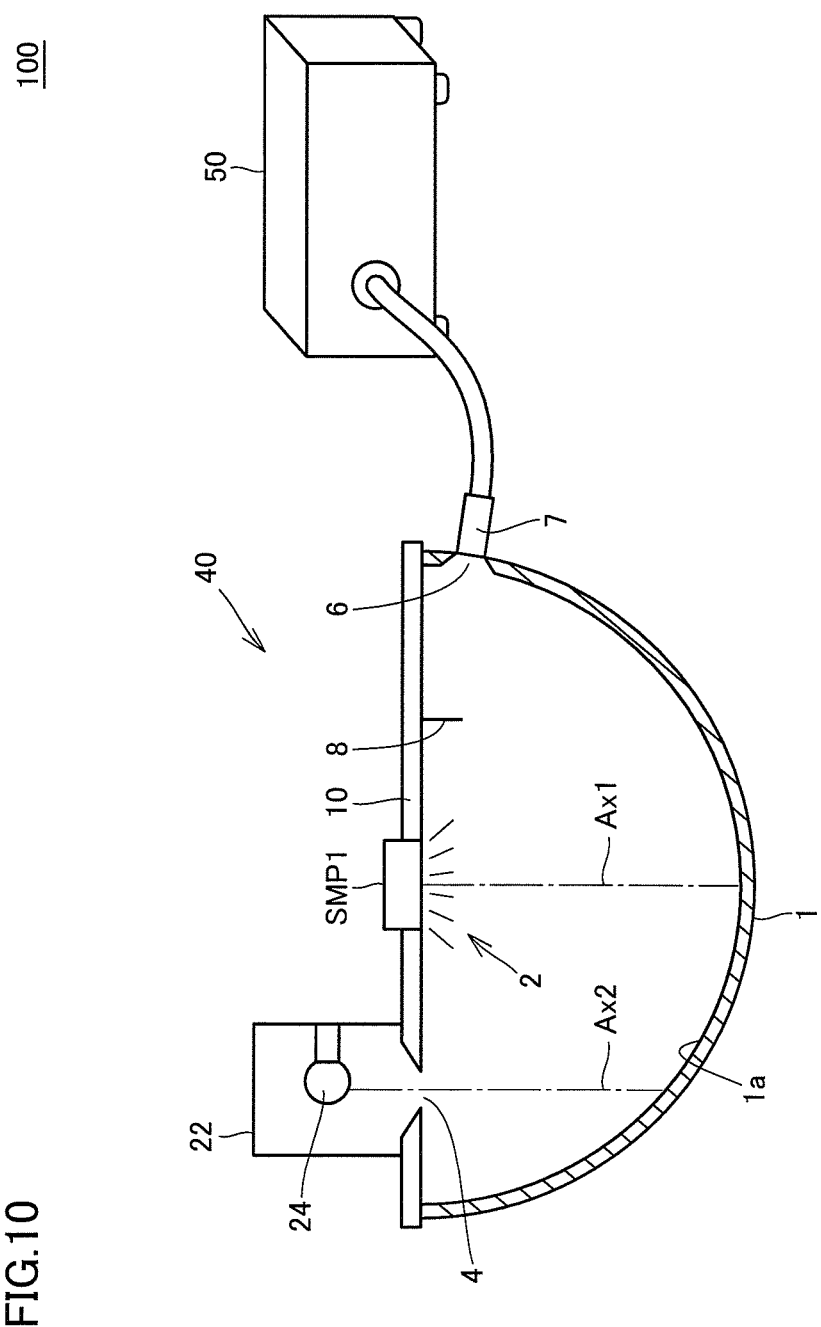
FIG. 10 shows a configuration of an optical measurement apparatus for Application 1 in the embodiment of the present invention.

Referring to FIG. 10, a hemispherical optical integrator 40 to constitute an optical measurement apparatus 100 is basically similar to the hemispherical optical integrator shown in FIG. 1. A difference therebetween is that an illumination window 4 that is an opening for allowing a luminous flux used for measuring self absorption to be radiated toward the inner surface of hemispherical portion 1 is provided in plane portion 10. On the outside of plane portion 10, a light source housing 22 for accommodating a compensation light source 24 is disposed to communicate with illumination window 4. Compensation light source 24 is, as described later, a light source for self-absorption measurement provided in order to calculate a compensation factor for compensating for absorption of light by light source SMF 1 to be measured. In the following, for distinguishing from the luminous flux generated from light source SMP 1, the luminous flux generated from compensation light source 24 will also be referred to as "compensation luminous flux".

Optical measurement apparatus 100 includes a detection processing unit 50 that detects the illuminance at the inner wall of hemispherical portion 1 through observation window 6 and light receiving portion 7 to calculate a compensation factor for self absorption by light source SMP 1 and accordingly measure the total luminous flux of light source SMP 1.

Next, a procedure for measuring the total luminous flux of light source SMP 1 with optical measurement apparatus 100 will be described.

Figure 11:
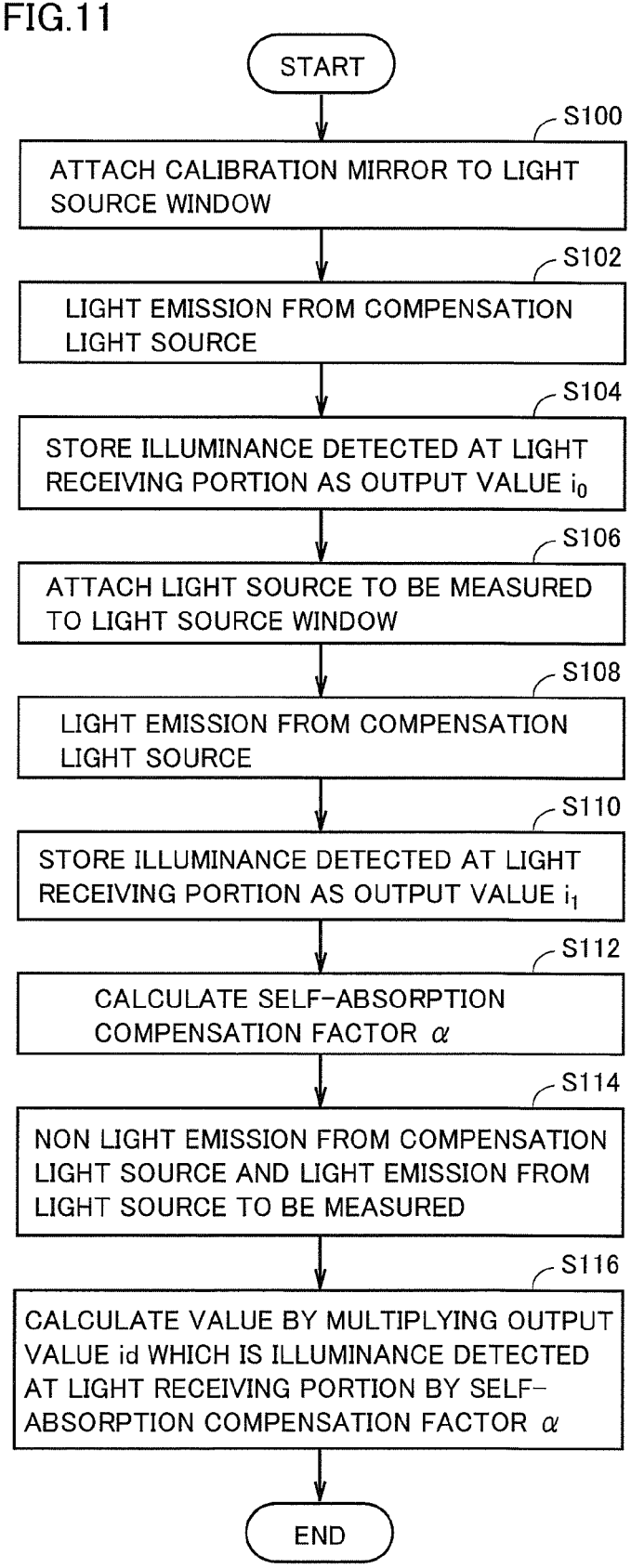
FIG. 11 is a flowchart showing a procedure for measuring the total luminous flux of a light source by means of the optical measurement apparatus for Application 1 in the embodiment of the present invention.

Referring to FIG. 11, a user first attaches a calibration mirror to light source window 2 (step S100), and lights compensation light source 24 so that it emits light (step S102). Then, the user inputs to detection processing unit 50 a selection command indicating that "the calibration mirror is attached to light source window 2 and only compensation light source 24 is emitting light". In response to this, detection processing unit 50 temporarily stores the illuminance detected at light receiving portion 7 at this time, as an output value $i_0$ (step S104).

It is noted that the whole of inner portion 14 forming a part of plane portion 10 may be used as the calibration mirror. Specifically, inner portion 14 may be designed to have the same cross-sectional shape as light source SMP 1 to be measured (light source window 2), and the state where inner portion 14 is attached may be defined as "a state where a calibration mirror is attached to light source window 2".

Next, the user attaches light source SMP 1 to be measured to light source window 2 (step S106), and lights compensation light source 24 so that it emits light (step S108). Then, the user inputs to detection processing unit 50 a selection command indicating that "light source SMP 1 to be measured is attached to light source window 2 and only compensation light source 24 is emitting light". In response to this, detection processing unit 50 temporarily stores the illuminance detected at light receiving portion 7 at this time, as output value $i_1$ (step S110).

Further, detection processing unit 50 divides output value $i_1$ by output value $i_0$ to calculate a self-absorption compensation factor α (step S112). Detection processing unit 50 stores the calculated self-absorption compensation factor α.

Next, with light source SMP 1 to be measured being attached to light source window 2, the user turns off compensation light source 24 so that it does not to emit light, and lights light source SMP 1 to be measured so that it emits light (step S114). Then, the user inputs to detection processing unit 50 a selection command indicating that "light source SMP 1 to be measured is attached to light source window 2 and only light source SMP 1 to be measured is emitting light". In response to this, detection processing unit 50 multiplies an output value $i_d$ which is the illuminance detected at light receiving portion 7 at this time by self-absorption compensation factor α calculated in step S112, and outputs the calculated value as a relative value representing the total luminous flux of light source SMP 1 to be measured (step S116). Then, the procedure is ended.

<F. Application 2>

Next, a description will be given of a configuration where hemispherical optical integrator 40 according to the present embodiment is used to measure the quantum efficiency of an object to be measured. This quantum efficiency refers to the ratio of the number of photons of fluorescence to the number of photons absorbed by the object to be measured (typically a phosphor).

Figure 12:
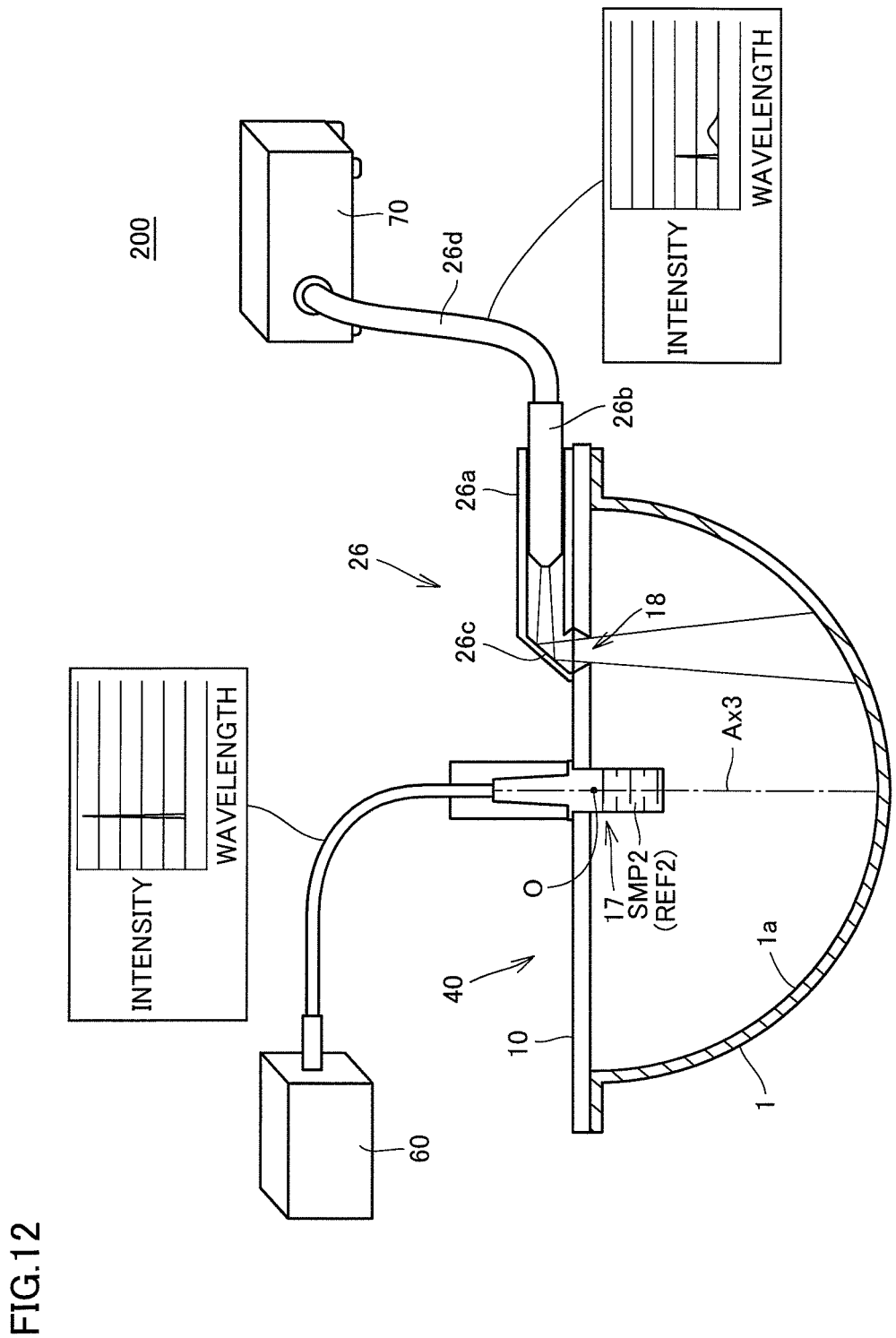
FIG. 12 shows a configuration of an optical measurement apparatus for Application 2 in the embodiment of the present invention.

Referring to FIG. 12, a hemispherical optical integrator 40 for constituting an optical measurement apparatus 200 includes a hemispherical portion 1, and a plane portion 10 disposed to close an opening of hemispherical portion 1. Plane portion 10 has a light source window 17 and an observation window 18 that allow the inside and the outside of hemispherical portion 1 to communicate with each other. Specifically, light source window 17 is formed in a region including the substantial center of curvature O of hemispherical portion 1. Observation window 18 is an opening for measuring the illuminance at the inner wall of hemispherical portion 1, and provided at a position separated outward by a predetermined distance from light source window 17.

Optical measurement apparatus 200 includes a light source 60 for applying excitation light to a sample SMP 2 or a reference object REF 2 (its transmittance characteristic is known), and a spectroscopic processing unit 70 for measuring the quantum efficiency of sample SMP 2.

The excitation light generated by light source 60 is applied through light source window 17 along an optical axis Ax3 which coincides with the normal to plane portion 10. This excitation light is transmitted through sample SMP 2 or reference object REF 2 attached to light source window 17. As this excitation light, monochromatic ultraviolet light in the range of 200 to 400 nm is used in the case of a low-pressure mercury fluorescent lamp, and monochromatic ultraviolet or visible light in the range of 300 to 600 nm is used in the field of the LED (Light Emitting Diode).

On the outside of plane portion 10, a light receiving portion 26 for detecting a spectrum at the inner wall of hemispherical portion 1 is disposed so that it communicates with observation window 18. In light receiving portion 26, an optical fiber 26d for guiding light to spectroscopic processing unit 70 as well as a fiber end 26b connected to optical fiber 26d are inserted in a casing 26a covering observation window 18. In casing 26a, a reflection portion 26c is provided for converting the direction of propagation of light entering through observation window 18 by approximately 90° and directing it to fiber end 26b.

Spectroscopic processing unit 70 detects the spectrum of the light introduced by optical fiber 26d. Typically, spectroscopic processing unit 70 is configured to include a diffraction grating and a line sensor associated with the directions of diffraction of the diffraction grating, and outputs the intensity of the input light for each wavelength.

Figure 13:
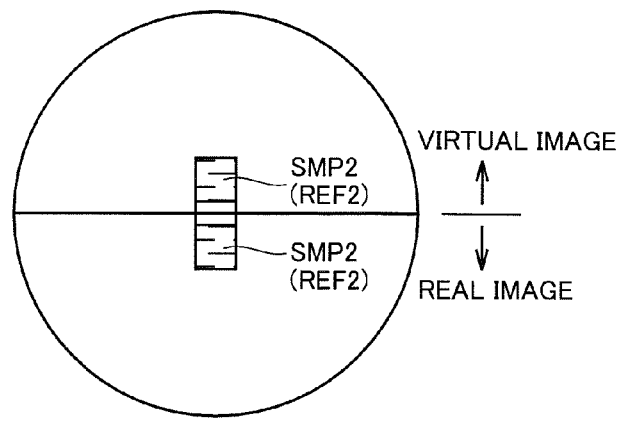
FIG. 13 shows a virtual integrating space created by the optical measurement apparatus shown in FIG. 12.

From the fluorescence generated by sample SMP 2 or reference object REF 2 attached in hemispherical optical integrator 40 shown in FIG. 12 as well, a real image and a virtual image are created as described above. Namely, as shown in FIG. 13, in the virtual integrating space, two samples SMP 2 or reference objects REF 2 are disposed.

Figure 14A:
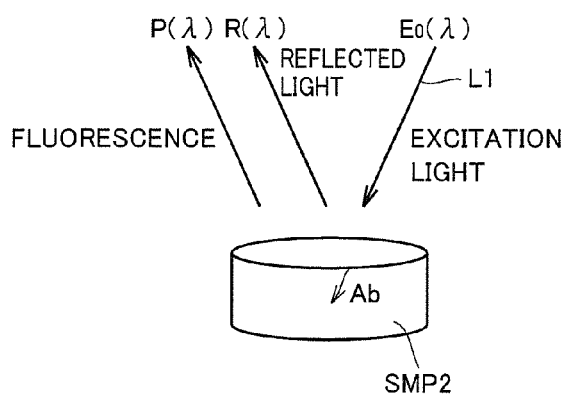
FIGS. 14A and 14B are diagrams for illustrating a principle of measurement of the quantum efficiency for Application 2 in the embodiment of the present invention.

Referring to FIG. 14A, when excitation light L1 is applied to sample SMP 2 which is for example a phosphor, a part (photons) thereof is absorbed and used for generation of fluorescence, and the remaining part of excitation light L1 is reflected from the surface. It is assumed here that excitation light L1 has a wavelength range of $\lambda_{1L}$ to and the fluorescence component generated from sample SMP 2 has a wavelength range of $\lambda_{2L}$ to $\lambda_{2H}$. In general, excitation light L1 is ultraviolet light and the fluorescence is visible light. Therefore, the wavelength range $\lambda_{1L}$ to $\lambda_{1H}$ and the wavelength range $\lambda_{2L}$ to $\lambda_{2H}$ do not overlap. Therefore, at spectroscopic processing unit 70, components corresponding respectively to these wavelength ranges may selectively be extracted from the measured spectrum to separate them from each other.

Here, the spectrum of excitation light L1 is denoted by $E_0$ ($\lambda$). Further, the spectrum of the fluorescence component generated from sample SMP 2 to which excitation light L1 is applied is denoted by P ($\lambda$), and the spectrum of the reflected light component reflected by sample SMP 2 is denoted by R ($\lambda$). In other words, spectrum P ($\lambda$) of the fluorescence component corresponds to the component of the wavelength range ($\lambda_{2L}$ to $\lambda_{2H}$) corresponding to the fluorescence of spectrum $E^{(1)}$ ($\lambda$) measured by spectroscopic processing unit 70 when sample SMP 2 is attached, and spectrum R ($\lambda$) of the reflected light component corresponds to the component of the wavelength range ($\lambda_{1L}$ to $\lambda_{1H}$) corresponding to excitation light L1 of spectrum $E^{(1)}$ ($\lambda$) measured by spectroscopic processing unit 70.

Figure 14B:
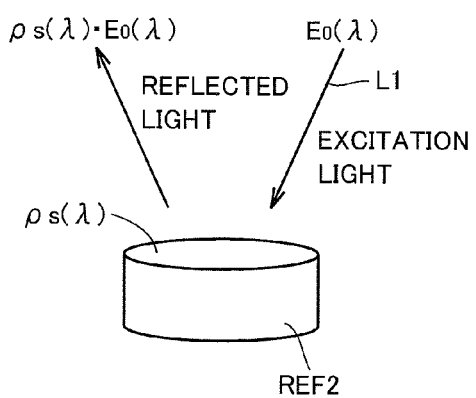

Further, as shown in FIG. 14B where the reflectance characteristic of reference object REF 2 is denoted by $\rho_S$ ($\lambda$), the spectrum measured when excitation light L1 having spectrum $E_0$ ($\lambda$) is applied to reference object REF 2 is expressed as $E^{(2)}(\lambda) = \rho_S(\lambda) \cdot E_0(\lambda)$. From this expression, spectrum $E_0$ ($\lambda$) of excitation light L1 may be represented as expression (4).

$$E_0(\lambda) = E^{(2)}(\lambda)/\rho_s(\lambda) \quad (4)$$

Further, as shown in FIG. 14A, a component (photon) determined by removing from spectrum $E_0$ ($\lambda$) of excitation light L1, spectrum R ($\lambda$) of the reflected light component reflected by sample SMP 2 can be regarded as being absorbed by sample SMP 2.

Therefore, for conversion of the spectrum (radiation power) into the number of photons, the spectrum may be divided by hc/$\lambda$ (where h: Planck's constant, c: speed of light), so that the number of photons Ab absorbed by sample SMP 2 may be represented as expression (5) where k=1/hc.

$$Ab = k \cdot \int_{\lambda_{1L}}^{\lambda_{1H}} \lambda \cdot \left\{ \frac{E^{(2)}(\lambda)}{\rho_S(\lambda)} - E^{(1)}(\lambda) \right\} \delta\lambda \quad (5)$$

Further, the number of photons Pph of the fluorescence may be represented as expression (6).

$$Pph = k \cdot \int_{\lambda_{2L}}^{\lambda_{2H}} \lambda \cdot E^{(1)}(\lambda) \delta\lambda \quad (6)$$

Therefore, the internal quantum efficiency QEin of sample SMP 2 may be represented as expression (7).

$$QE_{in} = Pph/Ab \quad (7)$$

As seen from the above, when the quantum efficiency is to be measured by means of optical measurement apparatus 200, the quantum efficiency of sample SMP 2 is calculated based on a first spectrum ($E^{(1)}$ ($\lambda$)) measured by spectroscopic processing unit 70 when excitation light from light source 60 is applied to sample SMP 2 to be measured that is disposed to be partially exposed in hemispherical portion 1, and a second spectrum ($E^{(2)}$ ($\lambda$)) measured by spectroscopic processing unit 70 when excitation light from light source 60 is applied to reference object REF 2 disposed instead of sample SMP 2 and having a reflectance characteristic or transmittance characteristic that is known.

Next, a procedure for measuring the quantum efficiency of sample SMP 2 by means of optical measurement apparatus 200 will be described.

Referring to FIG. 15, a user first attaches sample SMP 2 to light source window 17 (step S200), and causes radiation of excitation light from light source 60 and measurement by spectroscopic processing unit 70 to be started (step S202). The user inputs to spectroscopic processing unit 70 a selection command indicating that "sample SMP 2 is attached to light source window 17". Spectroscopic processing unit 70 temporarily stores spectrum $E^{(1)}$ ($\lambda$) measured at this time (step S204).

Next, the user attaches reference object REF 2 to light source window 17 (step S206), and causes radiation of excitation light from light source 60 and measurement by spectroscopic processing unit 70 to be started (step S208). The user inputs to spectroscopic processing unit 70 a selection command indicating that "reference object REF 2 is attached to light source window 17". Spectroscopic processing unit 70 temporarily stores spectrum $E^{(2)}$ ($\lambda$) measured at this time (step S210).

After spectrum $E^{(1)}$ ($\lambda$) and spectrum $E^{(2)}$ ($\lambda$) have been obtained, spectroscopic processing unit 70 calculates, based on these spectrums, internal quantum efficiency QEin of sample SMP 2 (step S212). More specifically, spectroscopic processing unit 70 calculates the number of photons Ab absorbed by sample SMP 2, based on the wavelength component corresponding to the wavelength range $\lambda_{1L}$ to $\lambda_{1H}$ of spectrum $E^{(1)}$ ($\lambda$), the wavelength component of spectrum $E^{(2)}$ ($\lambda$), and reflectance characteristic $\rho_S$ ($\lambda$) of reference object REF 2. Spectroscopic processing unit 70 also calculates the number of photons Pph of the fluorescence based on the wavelength component corresponding to the wavelength range $\lambda_{2L}$ to $\lambda_{2H}$ of spectrum $E^{(1)}$ ($\lambda$). Further, spectroscopic processing unit 70 calculates internal quantum efficiency QEin of sample SMP 2 based on the number of photons Ab and the number of photons Pph.

Further, spectroscopic processing unit 70 outputs the calculated internal quantum efficiency QEin of sample SMP 2 (step S214). Here, examples of output of internal quantum efficiency QEin include display on a monitor or the like of internal quantum efficiency QEin, printed output of internal quantum efficiency QEin, storage of internal quantum efficiency QEin in a storage medium, and the like. Then, the procedure is ended.

It is noted that the flowchart shown in FIG. 15 illustrates, as an example of the measurement procedure, an exemplary process in which spectrum $E^{(1)}$ ($\lambda$) of sample SMP 2 is first obtained and subsequently spectrum $E^{(2)}$ ($\lambda$) of reference object REF 2 is obtained; however, as long as spectrum $E^{(1)}$ ($\lambda$) and spectrum $E^{(2)}$ ($\lambda$) can be obtained, the order is not limited to the above-described one. For example, spectrum $E^{(2)}$ ($\lambda$) of reference object REF 2 may first be obtained and thereafter spectrum $E^{(1)}$ ($\lambda$) of sample SMP 2 may be obtained. In this case, spectrum $E^{(2)}$ ($\lambda$) obtained for reference object REF 2 may be used to successively obtain respective spectrums $E^{(1)}$ ($\lambda$) of multiple samples SMP 2, so that internal quantum efficiency QEin of multiple samples SMP 2 can efficiently be calculated. Namely, after reference object REF 2 is attached to light source window 17 and spectrum $E^{(2)}$ ($\lambda$) is obtained, multiple samples SMP 2 may be attached to light source window 17 successively.

<G. Application 3>

Regarding optical measurement apparatus 200 for Application 2 in the present embodiment as described above, a configuration where excitation light is transmitted through sample SNIP 2 and reference object REF 2 to measure the quantum efficiency has been illustrated. In contrast, the quantum efficiency may be measured by applying excitation light to sample SMP 2 and reference object REF 2 and measuring the reflected light.

gate time refers to the exposure time taken for obtaining a predetermined amount of light at spectroscopic processing unit 70.

Measurement was also performed for the case where excitation light is directly applied to the BAM sample, and further for the case where excitation light is applied to the inner surface of hemispherical portion 1 at which the BAM sample is absent to indirectly cause excitation.

The results of the measurement are as follows.

|  | Specular Reflector | | | Diffuse Reflector | | | Ratio (specular/diffuse) | | |
| --- | --- | --- | --- | --- | --- | --- | --- | --- | --- |
| wavelength | excitation | sample | re-excitation | excitation | sample | re-excitation | excitation | sample | re-excitation |
| 260 | 7,306 | (20,000) | 6,805 | 6,117 | (20,000) | 5,785 | 1.194 | 1.000 | 1.176 |
| 280 | 4,031 | 17,868 | 3,836 | 3,445 | 15,839 | 3,390 | 1.170 | 1.128 | 1.132 |
| 300 | 1,563 | 10,080 | 1,622 | 1,150 | 8,881 | 1,219 | 1.359 | 1.135 | 1.331 |
| 320 | 971 | 7,446 | 1,021 | 710 | 6,546 | 760 | 1.368 | 1.137 | 1.343 |
| 340 | 725 | 4,783 | 759 | 532 | 3,542 | 565 | 1.363 | 1.350 | 1.343 |
| 360 | 687 | 2,349 | 705 | 511 | 1,773 | 544 | 1.344 | 1.325 | 1.296 |
| 380 | 482 | 1,194 | 499 | 383 | 950 | 400 | 1.258 | 1.257 | 1.248 |
| 400 | 470 | 800 | 479 | 398 | 660 | 409 | 1.181 | 1.212 | 1.171 |

Figure 16:
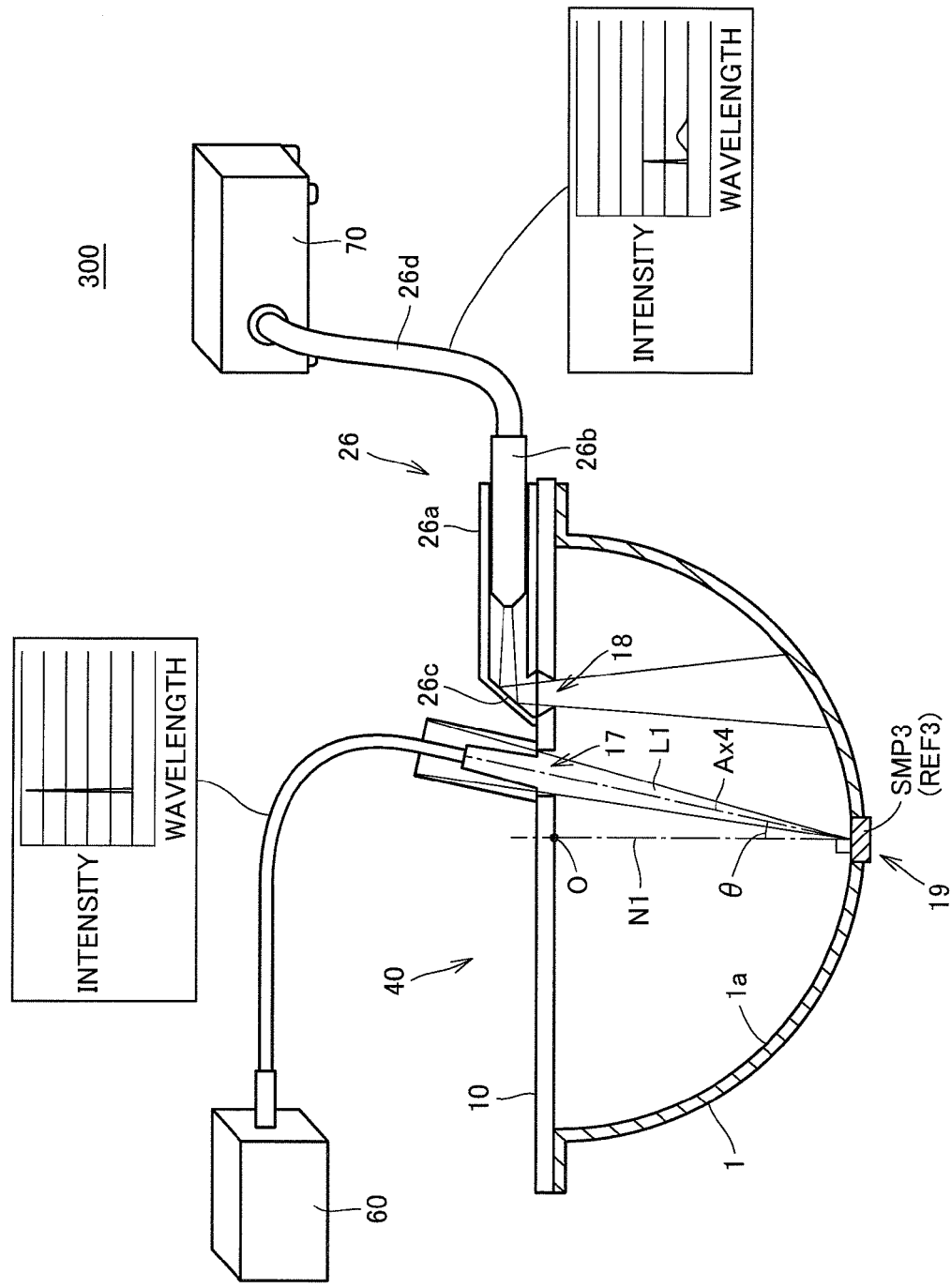
FIG. 16 shows a configuration of an optical measurement apparatus for Application 3 in the embodiment of the present invention.

Referring to FIG. 16, an optical measurement apparatus 300 for Application 3 in the present embodiment differs from optical measurement apparatus 200 (FIG. 12) for Application 2 in the present embodiment in that a light source window 17 is provided at a position displaced from the center of curvature O of the inner surface of hemispherical portion 1 and that a sample window 19 is provided near the vertex of hemispherical portion 1 for attaching a sample SMP 3 and a reference object REF 3. Optical measurement apparatus 300 is similar to optical measurement apparatus 200 in other respects, and the detailed description thereof will not be repeated.

Excitation light generated by light source 60 is applied through light source window 17 along optical axis Ax4 having angle θ to normal N1 to plane portion 10 toward sample SMP 3 or reference object REF 3 attached to sample window 19.

Sample window 19 is provided at the position of the intersection with normal N1 to plane portion 10 that passes the center of curvature O of the inner surface of hemispherical portion 1. Namely, sample window 19 is provided at the position of the vertex of the hemisphere enclosed by hemispherical portion 1 and plane portion 10. Then, sample SMP 3 or reference object REF 3 is attached to sample window 19. Excitation light applied to the attached sample SMP 3 causes fluorescence to be generated.

A procedure for measuring the quantum efficiency of sample SMP 3 by means of optical measurement apparatus 300 is similar to the flowchart shown in FIG. 15, and the detailed description thereof will not be repeated.

<H. Example of Measurement>

The inventors of the present patent application have used optical measurement apparatus 300 shown in FIG. 16 to evaluate a difference in measurement efficiency between a plane portion formed of a high-reflection-treated mirror produced by applying a coating to an aluminum-deposited mirror, and a plane portion formed of sintered polytetrafluoroethylene (PTFE).

More specifically, to sample window 19 of optical measurement apparatus 300 shown in FIG. 16, a reference object of barium sulfate or blue phosphor sample (BAM sample) was attached, excitation light was applied to the reference object or BAM sample, and the gate time was measured. The In the table above, "mirror reflector" represents the case where the plane portion is formed of a high-reflection-treated mirror, and "diffuse reflector" represents the case where the plane portion is formed of sintered polytetrafluoroethylene. Further, "excitation" represents the case where excitation light is directly applied to the reference object having a surface to which barium sulfate is applied, "sample" represents the case where excitation light is directly applied to the BAM sample, and "re-excitation" represents the case where excitation light is indirectly applied to the BAM sample. As the excitation light, monochromatic light of eight different types of wavelengths different from each other by 20 nm in a range of 260 nm to 400 nm was used.

The numerical values in the table above are expressed in the unit "msec". It is noted that, where the wavelength 260 nm is used to excite the BAM sample, the generated light is very weak and the light cannot adequately be obtained, and the exposure time of spectroscopic processing unit 70 is a maximum value of 20000 msec.

Further, in the table above, a difference (ratio) between the two different materials is calculated (see Ratio). From the result of calculation, it is seen that the gate time can be made shorter by forming the plane portion of sintered polytetrafluoroethylene. Namely, a plane portion formed of sintered polytetrafluoroethylene can be used to reduce light absorption of the optical integrator and obtain a higher integrating efficiency.

<I. Conclusion>

The hemispherical optical integrator according to the present embodiment uses a structure, for a plane portion to form an integrating space, in which an outer portion formed of a material that causes mirror reflection (specular reflection) and an inner portion formed of a material having a higher reflectance for at least the ultraviolet region than the material for the outer portion are combined.

Such a plane portion can be employed to use a reflection member formed of sintered polytetrafluoroethylene (PTFE) or the like having a relatively high reflectance, and thereby enhance the integrating efficiency of the hemispherical optical integrator. Meanwhile, since the reflection member such as PTFE is of a lower cost than a high-reflection-treated mirror, the cost of the whole optical measurement apparatus can be reduced.

In this way, the integrating sphere with a relatively high integrating efficiency can be achieved, and therefore, for measurement of the total luminous flux of a light source for example, the illuminance at a wall surface to be detected can further be increased. Consequently, errors due to light absorption in the integrating sphere and noise of the detector can be reduced. Further, for a phosphor sample with a low emission intensity as well, its quantum efficiency can more precisely be measured.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical measurement apparatus comprising:
   a hemispherical portion having a diffuse reflection layer on an inner wall; and
   a plane portion, disposed to involve a substantial center of curvature of said hemispherical portion and close an opening of said hemispherical portion, having a reflection layer that faces an inner surface side of said hemispherical portion,
   said plane portion including:
      at least one of a window for introducing light to be homogenized in an integrating space formed between said hemispherical portion and said plane portion, and a window for extracting light homogenized in said integrating space;
      an outer portion formed of a first material chiefly causing specular reflection, and occupying at least a region of a predetermined width from an outermost circumference at which said plane portion abuts on the inner wall of said hemispherical portion; and
      an inner portion formed of a second material chiefly causing diffuse reflection and having a higher reflectance for at least an ultraviolet region than said first material, and occupying a region inside said outer portion.

2. The optical measurement apparatus according to claim 1, wherein
   a range of said inner portion is defined so that an influence of light absorption between said inner portion and the inner wall of said hemispherical portion is substantially negligible.

3. The optical measurement apparatus according to claim 1, wherein
   a range of said inner portion is defined so that light absorptance in said integrating space is a predetermined value or less.

4. The optical measurement apparatus according to claim 3, wherein
   said predetermined value is 10%.

5. The optical measurement apparatus according to claim 1, wherein
   said inner portion is disposed in a circle having a radius of a length of 50% to 70% relative to a distance from the substantial center of curvature of said hemispherical portion to said outermost circumference.

6. The optical measurement apparatus according to claim 5, wherein
   said inner portion is a polygon and said circle is a circumcircle of the polygon.

7. The optical measurement apparatus according to claim 1, wherein
   said inner portion is defined to have an area of 25% to 50% relative to an area of a region within said outermost circumference.

8. The optical measurement apparatus according to claim 1, wherein
   said outer portion is formed of a metal-deposited mirror, and
   said inner portion is formed of one of sintered polytetrafluoroethylene and barium sulfate.

9. The optical measurement apparatus according to claim 1, wherein
   said plane portion includes a first window to which a light source to be measured can be attached so that a luminous flux generated from the light source is applied toward the inner wall of said hemispherical portion, and
   said optical measurement apparatus further comprises:
   a detector for detecting illuminance at the inner wall of said hemispherical portion through a second window disposed at said hemispherical portion or said plane portion; and
   a blocking portion disposed on a path from said first window to said second window.

10. The optical measurement apparatus according to claim 1, wherein
    said plane portion includes a first window provided near the substantial center of curvature of said hemispherical portion, and a second window provided at a position separated by a predetermined distance from said first window, and
    said optical measurement apparatus further comprises:
    a light source for emitting excitation light through said first window;
    a spectroscope for measuring a spectrum at the inner wall of said hemispherical portion through said second window; and
    a processing unit for calculating a quantum efficiency of an object to be measured that is disposed to have at least a portion exposed to inside of said hemispherical portion, based on a first spectrum measured by said spectroscope when said excitation light is applied from said light source to said object to be measured, and a second spectrum measured by said spectroscope when said excitation light is applied from said light source to a reference object disposed instead of said object to be measured and having a known reflectance characteristic or transmittance characteristic.

* * * * *